(12) United States Patent
Bethge et al.

(10) Patent No.: US 10,795,945 B2
(45) Date of Patent: Oct. 6, 2020

(54) DIGITAL DOCUMENTS IN A DISTRIBUTED STORAGE ENVIRONMENT

(71) Applicant: SAP SE, Walldorf (DE)

(72) Inventors: Ricarda Bethge, Potsdam (DE); Mathias Held, Potsdam (DE); Arne Scherrer, Kleinmachnow (DE)

(73) Assignee: SAP SE, Walldorf (DE)

( * ) Notice: Subject to any disclaimer, the term of this patent is extended or adjusted under 35 U.S.C. 154(b) by 169 days.

(21) Appl. No.: 16/209,767

(22) Filed: Dec. 4, 2018

(65) Prior Publication Data

US 2020/0175080 A1  Jun. 4, 2020

(51) Int. Cl.
| | |
|---|---|
| *G06F 16/93* | (2019.01) |
| *G06F 16/182* | (2019.01) |
| *H04L 9/06* | (2006.01) |
| *G06F 16/18* | (2019.01) |
| *H04L 9/32* | (2006.01) |

(52) U.S. Cl.
CPC ............ *G06F 16/93* (2019.01); *G06F 16/182* (2019.01); *G06F 16/1805* (2019.01); *H04L 9/0643* (2013.01); *H04L 9/3247* (2013.01); *H04L 2209/38* (2013.01)

(58) Field of Classification Search
CPC ..... G06F 16/93; G06F 16/182; G06F 16/1805
See application file for complete search history.

(56) References Cited

U.S. PATENT DOCUMENTS

2019/0013933 A1*  1/2019  Mercuri .............. G06F 11/3476
2019/0334920 A1*  10/2019  Kelly ..................... H04L 9/3239

* cited by examiner

*Primary Examiner* — Loc Tran
(74) *Attorney, Agent, or Firm* — Schwegman Lundberg & Woessner, P.A.

(57) ABSTRACT

Disclosed are systems, methods, and non-transitory computer-readable media for a digital document engine for multi-entity process integration. A digital document system accesses a digital document configuration file identifying entities entering into an agreement, an initial set of terms, and a modification to the initial set of terms corresponding to a triggering event. The digital document system generates a digital document based on the digital document configuration file, the digital document including computer readable code to cause the initial set of terms to be modified according to the modification in response to occurrence of the triggering event. The digital document is stored to a distributed database, wherein it is invokable by the entities for enforcement. When invoked, the computer readable code causes a computing device to determine whether the triggering event occurred and modify the initial set of terms based on the modification when the triggering event has occurred.

17 Claims, 6 Drawing Sheets

```
400
     {
         "id": "Contract_000000001",
         "owner": "Supplier001",
402      "status": "UNSIGNED",
         "lastModificationTime": "2018-05-25T 10:38:03",
         "neededSignatures": [
             "Supplier001",
             "Buyer003"
         ],
         "document": {
             "orderHash": "Order_00000001",
404          "parties": [
                 {
                     "identity": "Buyer003",
                     "role": "buyer"
                 },
                 {
                     "identity": "Supplier001",
                     "role": "seller"
                 }
             ],
406          "rules": {
                 "overdueDel": {
                     "configuration": {
                         "discountInPercent": 5,
                         "itemID": 0,
408                      "latestDeliveryDate": "2018-03-26T11:47:19"
                     },
                     "description": "Reduce price by 5% if delivery is delayed",
                     "hash": "TJXQUYDU1WI84EU2OKFF",
410                  "ruleid": "overdueDel",
                     "title": "Overdue Delivery"
                 },
                 "ownershipTransfer": {
                     "configuration":
                     {
                         "itemID": 0
                     },
                     "description": "Transfer ownership if delivery is confirmed",
                     "hash": "678234ASDF456SDASD84",
                     "ruleid": "ownershipTransfer",
412                  "title": "Ownership Tansfer"
                 }
             },
             "signatures": [],
             "type": "Contract"
         }
     }
```

DIGITAL DOCUMENTS IN A DISTRIBUTED STORAGE ENVIRONMENT

TECHNICAL FIELD

An embodiment of the present subject matter relates generally to digital documents and, more specifically, to digital documents in a distributed storage environment.

BACKGROUND

Contractual agreements and business processes between companies are characterized by a very large degree of variability. Even within a single domain (e.g. order-to-cash (O2C), procure-to-pay (P2P) processes, etc.) their actual implementation varies from company to company or even for different business partners. For example, the temporal order of issuing an invoice and sending out the goods can be reversed. Also, different trust-levels or the history of business relations influence the terms of the contracts. In other words, contractual agreements and cross-company business processes display a large degree of variability and use data-models requiring support for many special cases. Accordingly, improvements are needed.

BRIEF DESCRIPTION OF THE DRAWINGS

Various ones of the appended drawings merely illustrate example embodiments of the present disclosure and cannot be considered as limiting its scope.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Disclosed are systems, methods, and non-transitory computer-readable media for implementing digital documents (e.g., smart contracts) in a distributed storage environment (e.g., on a distributed ledger). A digital document is a digital file stored in distributed database (e.g., a distributed database, block chain) that includes data defining a contractual agreement between two or more entities (e.g., people, organizations, etc.). In an example embodiment, the digital document identifies the entities bound by the contract, includes a set of terms agreed to by the entities, as well as any modifications to the terms in the event that a triggering event occurs (e.g., a term of the contract is not met). For example, a digital document defining a contract between two entities for the purchase of items may include data identifying the entities, the item to be purchased, the quantity of items to be purchased, a purchase price for the items, an expected delivery date for the items, as well as a modification to the price if the expected delivery date is not met (e.g., the price of the items is reduced by 10% if the expected delivery date is not met). Additionally, the digital document includes computer readable code that automatically determines whether a triggering event has occurred and modifies the terms of the contract in the event that the triggering event has occurred. For example, the digital document may determine whether the expected delivery date has been met, and adjust the price of the item if the expected delivery date has not been met.

In some embodiments, each digital document is stored on a distributed database (e.g., distributed storage environment), such as a blockchain. A distributed database is a database that is consensually shared and synchronized across a network spread across multiple sites, institutions or geographies. All data stored to a distributed database is securely and accurately stored using cryptography and can be accessed using keys and cryptographic signatures. This provides each entity to the digital document with accessibility to the digital document using the appropriate private key.

Once a digital document is stored to the distributed database, it becomes an immutable database and is governed by the rules of the network. This provides several advantages. For example, while centralized databases are prone to cyber-attack, distributed databases are inherently harder to attack because each of the distributed copies needs to be attacked simultaneously for an attack to be successful. Further, these records are resistant to malicious changes by a single entity.

As explained, the distributed database is accessible to the entities that have the appropriate private key. For example, the distributed database may be publicly accessible or restricted to members of the consortium. Accordingly, each entity may invoke the digital document. Once invoked, the computer readable code included in the digital document is executed, causing enforcement of the terms of the digital document. Accordingly, any entity that is an entity to a digital document can cause the digital document to be invoked, and the computer readable code included in the digital document will determine whether the agreed to terms of the digital document are met and modify the terms if needed.

Digital documents are generated and managed by a digital document system. The digital document system generates a digital document based on a digital document configuration file that defines the entities entering into the contractual agreement, an initial set of terms of the agreement, and any modifications to be made to the initial set of terms in the event that a triggering event occurs. For the digital document to become valid, each entity to the agreement provides their cryptographic signature, which is added to the digital document. The completed digital document is the stored to the distributed database.

To further simplify the process of generating a digital document, the digital document system maintains a library of digital document templates. A digital document template is a modifiable form that an entity may use to generate a digital document configuration file. For example, the digital document template may include template terms that are commonly used, and which an entity may modify if desired to meet their specific needs. The library of digital document templates may include categorizations of the digital document templates based on the type of underlying agreement or business use. Accordingly, an entity may first select a subset of the available digital document templates using the categorization, and then choose an appropriate digital document template from the subset.

Figure 1:
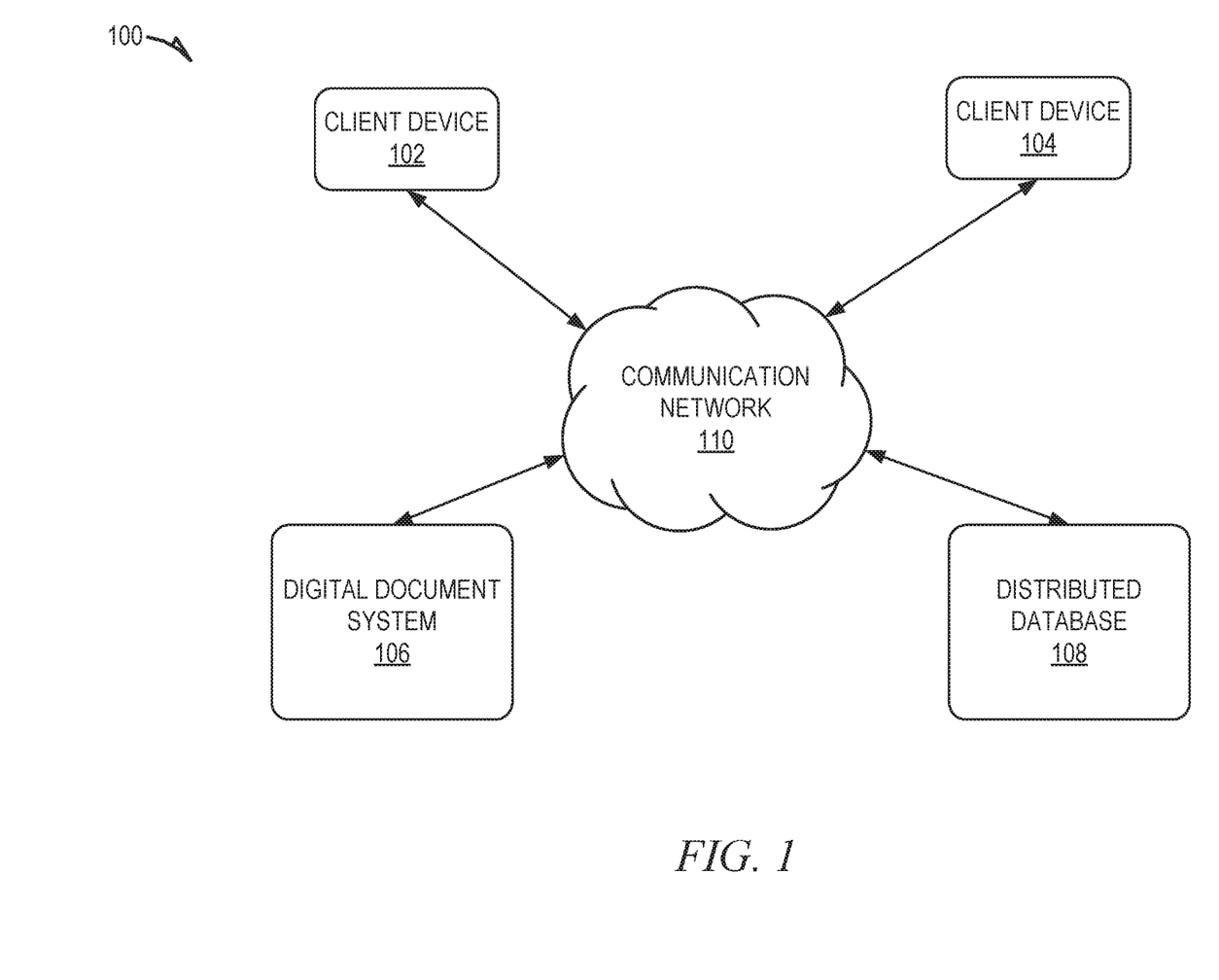
FIG. 1 shows a system wherein digital documents are implemented in a distributed storage environment, according to some example embodiments.

FIG. 1 shows a system wherein digital documents are implemented in a distributed storage environment, according to some example embodiments. As shown, multiple devices (i.e., client device 102, client device 104, digital document system 106, and distributed database 108) are connected to a communication network 110 and configured to communicate with each other through use of the communication network 110. The communication network 110 is any type of network, including a local area network (LAN), such as an intranet, a wide area network (WAN), such as the internet, or any combination thereof. Further, the communication network 110 may be a public network, a private network, or a combination thereof. The communication network 110 is implemented using any number of communications links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the computing system 600 shown in FIG. 6.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users interact with the digital document system 106 using the client devices 102 and 104 that are connected to the communication network 110 by direct and/or indirect communication. Although the shown system 100 includes only two client devices 102, 104, this is only for ease of explanation and is not meant to be limiting. One skilled in the art would appreciate that the system 100 can include any number of client devices 102, 104. Further, the digital document system 106 may concurrently accept connections from and interact with any number of client devices 102, 104. The digital document system 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with the digital document system 106 via a client-side application installed on the client devices 102 and 104. In some embodiments, the client-side application includes a component specific to the digital document system 106. For example, the component may be a stand-alone application, one or more application plug-ins, and/or a browser extension. However, the users may also interact with the digital document system 106 via a third-party application, such as a web browser, that resides on the client devices 102 and 104 and is configured to communicate with the digital document system 106. In either case, the client-side application presents a user interface (UI) for the user to interact with the digital document system 106. For example, the user interacts with the digital document system 106 via a client-side application integrated with the file system or via a webpage displayed using a web browser application.

The digital document system 106 is one or more computing devices configured to facilitate digital documents. A digital document is a digital file that includes data defining a contractual agreement between two or more entities. That is, a digital document identifies the entities bound by the contract, includes a set of terms agreed to by the entities, as well as any modifications to the terms in the event that a triggering event occurs (e.g., a term of the contract is not met). An entity may be any person, organization, company, group of people, etc. A digital document additionally includes computer readable code that automatically determines whether a triggering event has occurred and modifies the terms of the contract in the event that the triggering event has occurred.

The digital document system 106 generates a digital document based on a digital document configuration file that defines the entities entering into the contractual agreement, an initial set of terms of the agreement, and any modifications to be made to the initial set of terms in the event that a triggering event occurs. The digital document system 106 provides a user interface that enables users to enter data defining the entities and terms of the digital document, which is used to generate the digital document configuration files.

To further simplify the process of generating a digital document, the digital document system 106 maintains a library of digital document templates. A digital document template is a modifiable form that an entity may use to generate a digital document configuration file. For example, the digital document template may include template terms that are commonly used, and which an entity may modify if desired to meet their specific needs. The library of digital document templates may include categorizations of the digital document templates based on the type of underlying agreement or business use. Accordingly, an entity may first select a subset of the available digital document templates using the categorization, and then choose an appropriate digital document template from the subset.

The digital document system 106 uses the digital document configuration file to generate the digital document. That is, the digital document system 106 generates a digital file that identifies the entities and terms of the digital document. The digital document system 106 also generates the machine-readable code to perform any desired actions in relation to the terms of the digital document, such as determining whether a triggering event has occurred and modifying the terms of the digital document in the event that a triggering event has occurred. For example, the machine-readable code in a digital document may cause an invoice to be generated and sent to an appropriate entity of the contract for purchase of specified items. Further, the machine-readable code may cause a determination as to whether an agreed to delivery date was met, and adjust the price on the invoice in the event that the delivery date was not met. Accordingly, the digital document automatically enforces the terms of the contract.

The digital document system 106 may generate the set of machine-readable code using a set of template machine-readable code. That is, the digital document system 106 selects the appropriate template machine-readable code based on the terms provided by the user, and then modifies the template machine-readable code based on variables provided by the user, such as an expected delivery date, amount of discount, etc.

For the digital document to become valid, each entity to the agreement provides the digital document system 106 with their cryptographic signature. The digital document system 106 adds the cryptographic signatures to the generated digital document. The digital document system 106 then stores the completed digital document on the distributed database 108. A distributed database 108 is a database that is consensually shared and synchronized across a network of computing devices spread across multiple sites, institutions or geographies. All data stored to the distributed database 108 is securely and accurately stored using cryptography and can be accessed using keys and cryptographic signatures. This provides each entity to the digital document with accessibility to the digital document using the appropriate private key. For example, an entity may use their client device 102, 104 to access the digital document directly from the distributed database 108. As another example, the digital document system 106 may provide functionality that enables an entity to request access to the digital document.

Once a digital document is stored to the distributed database 108, it becomes an immutable database and is governed by the rules of the network. This provides several advantages. While centralized databases are prone to cyber-attack, the distributed database 108 is inherently harder to attack because each of the distributed copies needs to be attacked simultaneously for an attack to be successful. Further, these records are resistant to malicious changes by a single entity.

As explained, the distributed database 108 is publicly accessible to any entity that has the appropriate private key. Accordingly, each entity may invoke the digital document. Once invoked, the computer readable code included in the digital document is executed, causing enforcement of the terms of the digital document. Accordingly, either entity that is a party to a digital document can cause the digital document to be invoked, and the computer readable code included in the digital document will cause the distributed database 108 to determine whether the agreed to terms of the digital document are met and modify the terms if needed.

Figure 2:
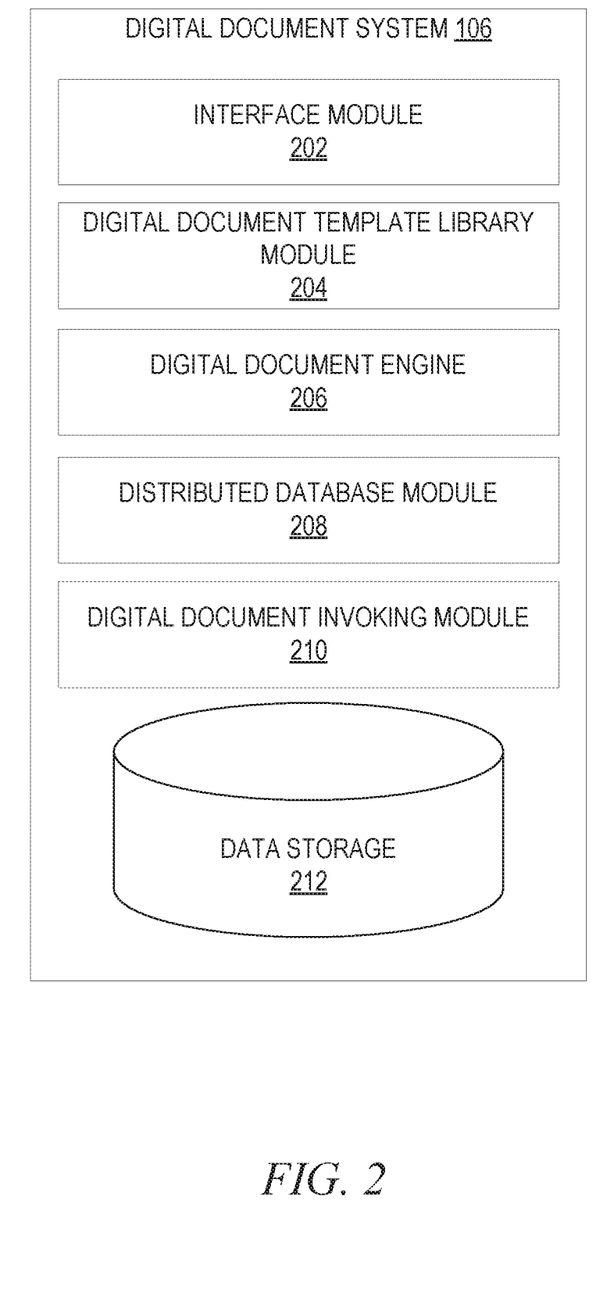
FIG. 2 is a block diagram of the digital document system, according to some example embodiments.

FIG. 2 is a block diagram of the digital document system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the digital document system 106 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the digital document system 106 includes an interface module 202, a digital document template library module 204, a digital document engine 206, a distributed database module 208, a digital document invoking module 210, and a data storage 212. The interface module 202 provides a user interface that enables entities to generate and invoke a digital document. That is, the interface module 202 transmits data to a client device 102 that is used to present the user interface on a display of the client device 102. The user interface includes user interface element (e.g., text fields, buttons, etc.) that enable a user of the client device 102 to utilize the functionality of the digital document system 106. For example, a user may use the user interface elements to select to generate a digital document, enter data to define the terms, entities, etc., of the digital document, view and select digital document templates, modify a digital document template, etc. Data provided by the user using the user interface is transmitted by the client device 102 back to the digital document system 106, where it is provided to the appropriate modules of the digital document system 106. For example, data provided by a user may be written to a digital document configuration file, which is then stored in the data storage 212.

The digital document template library module 204 manages and provides a library of digital document templates which may be used by an entity to generate a digital document. A digital document template is a digital document configuration file that includes a template set of terms that an entity may use or modify to create a digital document. For example, the template set of terms may be common terms used in contracts between users. The digital document templates are stored in the data storage 212. Accordingly, the digital document template library module 204 access the digital document templates from the data storage 212 and provides a listing of the available digital document templates and/or selected digital document templates to a requesting user. For example, the listing of the available digital document templates and/or selected digital document templates are presented to the user in the user interface facilitated by the interface module 202.

The digital document templates may include terms from common digital documents used across entities. Due to their digital nature, the terms and machine-readable code included in the digital document templates may be certified by trusted entities (e.g., accounting firms). That is, the digital document logic is audited together with the machine-readable terms of these rules (e.g., templates). The audit is performed jointly for both, the logic and the terms. However, the details of the terms like numbers and dates can be easily changed by the end user, as well as the selection of terms and rules to be used in a digital document. The digital document library may include digital document templates that are free for use by entities, as well as a marketplace of digital document templates that may be purchased. Accordingly, the digital document template library module 204 facilitates management of purchase transaction for digital document templates listed in the marketplace.

The digital document template library module 204 may provide descriptions of the digital document templates, that allow a user to learn about the available digital document templates and select an appropriate digital document template. The descriptions may further include user ratings and feedback that aid users in selection of a digital document template.

The digital document templates may also be categorized based on purpose and/or intent of the contract. Example categorizations may include digital document templates for order-to-cash and procure-to-pay processes. The digital document templates may be tagged with categorization data indicating the categories to which the digital document template is associated. The digital document template library module 204 presents a listing of the available categories to a user and uses a received selection to gather the corresponding digital document templates from the data storage 212 and/or present a listing of the corresponding digital document templates to the requesting user. This allows user to narrow their search and view only relevant digital document templates.

The digital document template library module 204 provides a selected digital document template to a user, which the user may then modify to their specific needs. For example, the user may provide data identifying the entities to the contract, modify the template terms, etc. The digital document template library module 204 may generate a digital document configuration file from the selected digital document template and any modifications made by a user.

The digital document engine 206 generates a digital document from a digital document configuration file. That is, the digital document engine 206 generates a digital file that identifies the entities and terms of the digital document. The digital document engine 206 also generates the machine-readable code to perform any desired actions in relation to the terms of the digital document, such as determining whether a triggering event has occurred and modifying the terms of the digital document in the event that a triggering event has occurred. For example, the machine-readable code in a digital document may cause an invoice to be generated and sent to an appropriate entity of the contract for purchase of specified items. Further, the machine-readable code may cause a determination as to whether an agreed to delivery date was met, and adjust the price on the invoice in the event that the delivery date was not met. Accordingly, the digital document automatically enforces the terms of the contract.

For the digital document to become valid, each entity to the agreement provides the digital document system 106 with their cryptographic signature. Accordingly, the digital document engine 206 prompts the entities to the contract to provide their cryptographic signatures. The digital document engine 206 may provide the entities with a copy of the terms of the digital document, which the entities may review prior to providing the cryptographic signature. The digital document engine 206 may also enable the users to further modify the digital document if desired. If an entity modifies the digital document, the digital document engine 206 may transmit a revised draft of the digital document to each entity and prompt the entities to provide their cryptographic signatures. The digital document engine 206 deems the digital document as valid after receiving the cryptographic signatures of each entity based on a most recent version of the digital document. The digital document engine 206 adds the received cryptographic signatures to the digital document. The functionality of the digital document engine 206 is discussed in greater detail in relation to FIG. 3.

The distributed database module 208 stores an authorized digital document on the distributed database 108. The distributed database 108 is a database that is consensually shared and synchronized across a network of computing devices spread across multiple sites, institutions or geographies. All data stored to the distributed database 108 by the distributed database module 208 is securely and accurately stored using cryptography and can be accessed using keys and cryptographic signatures. This provides each entity to the digital document with accessibility to the digital document using the appropriate private key. For example, an entity may use their client device 102, 104 to access and invoke the digital document directly from the distributed database 108. As another example, the digital document system 106 provides functionality that enables an entity to request access and invoke a digital document stored in the distributed database 108.

The digital document invoking module 210 enables an entity to request that a digital document be invoked. For example, the digital document invoking module 210 may require the entity to provide the private key needed to invoke the digital document, which the digital document invoking module 210 then uses to communicate with the distributed database 108 and invoke the digital document. Invoking the digital document causes the computer readable code included in the digital document to be executed. This may include performing specified action, checking in triggering events have occurred and/or modifying the terms of the digital document.

Figure 3:
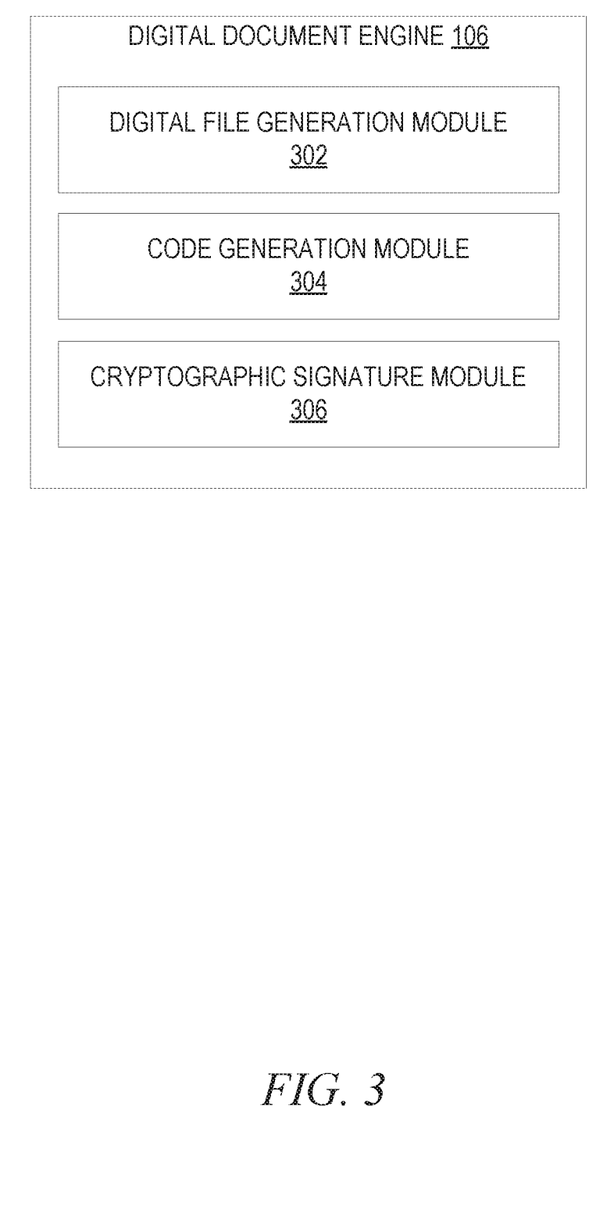
FIG. 3 is a block diagram of the digital document engine, according to some example embodiments.

FIG. 3 is a block diagram of the digital document engine 206, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the digital document engine 206 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the digital document engine 206 includes a digital file generation module 302, a code generation module 304, and a cryptographic signature module 306. The digital file generation module 302 generates a digital file based on a digital document configuration file. The digital file identifies the entities entering into the contract, as well as the terms of the contract. The terms may include any of a variety of terms, such as items to be purchased, services to be performed, expected delivery date, etc. The generated digital file is the basis for the digital document.

The code generation module 304 generates machine-readable code, such as programming code or a script, that is executed upon the digital contact being invoked. The code causes execution of terms of the digital document. For example, the code may cause payment to be transferred to a designated account, cause digital assets to be transferred, cause a transaction to be recorded, cause an invoice to be generated and transmitted to specified entities, etc. The code may also check whether a specified triggering event has occurred and modify the terms if the triggering event has occurred. The triggering event may be any type of designated event, such as a deadline elapsing, an action being performed, etc.

The code generation module 304 generates the code based on data included in the digital document configuration files. For example, the digital document configuration file may specify the actions to be performed when the digital document is invoked, any triggering events, and the corresponding actions to be performed in response to occurrence of a triggering event.

The cryptographic signature module 306 manages validation and finalization of the digital document. For the digital document to become valid, each entity to the agreement provides the digital document system 106 with their cryptographic signature. The cryptographic signature module 306 prompts the entities to the contract to provide their cryptographic signatures. The cryptographic signature module 306 may provide the entities with a copy of the terms of the digital document, which the entities may review prior to providing their cryptographic signature. The cryptographic signature module 306 may also enable the users to further modify the digital document if desired. If an entity modifies the digital document, the cryptographic signature module 306 may transmit a revised draft of the digital document to each entity and prompt the entities to provide their cryptographic signatures. The cryptographic signature module 306 deems the digital document as valid after receiving the cryptographic signatures of each entity based on a most recent version of the digital document.

Figure 4:
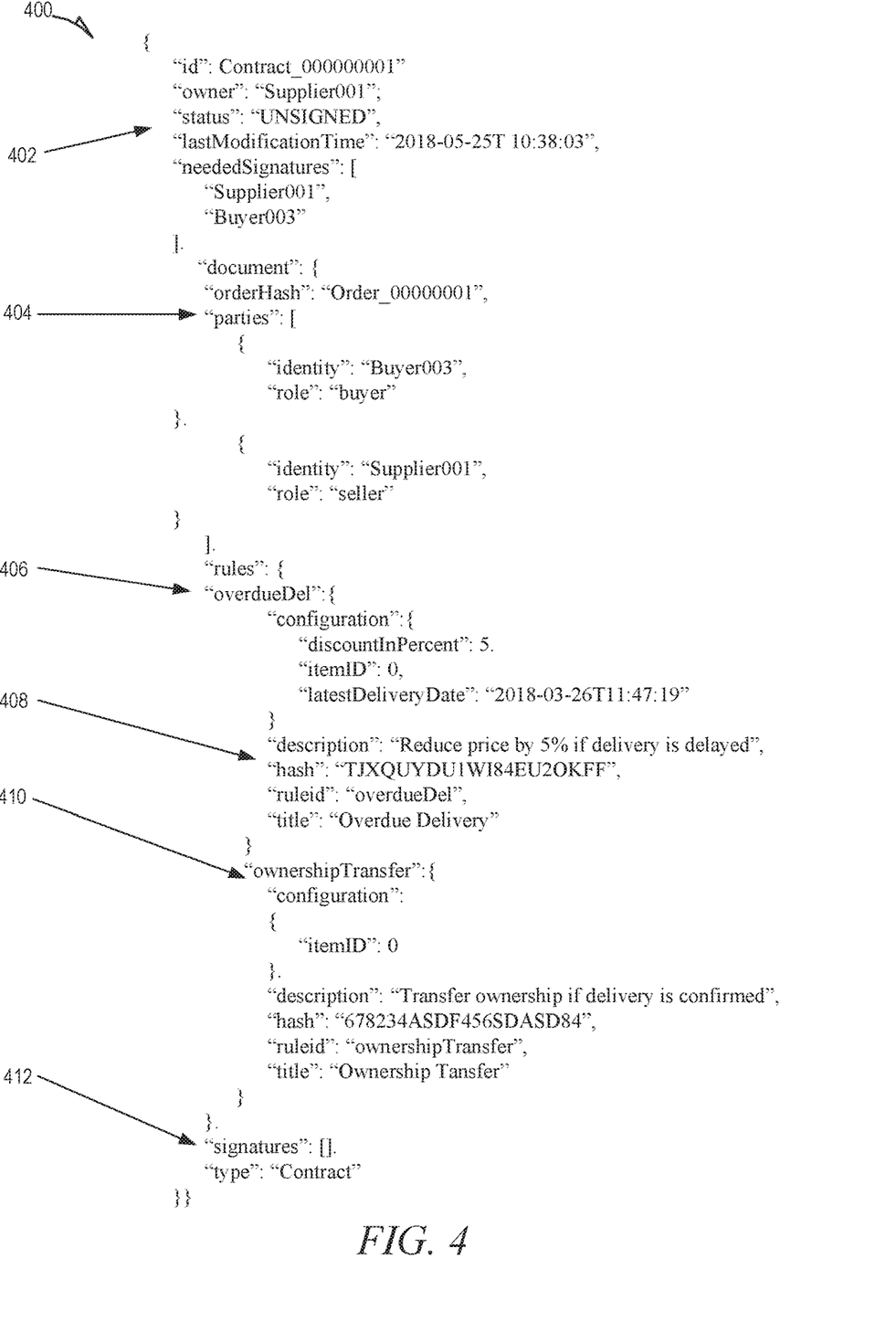
FIG. 4 is a digital document, according to some example embodiments.

FIG. 4 is a digital document 400, according to some example embodiments. As shown, the digital document is a digital document that includes the terms of a contractual agreement. The digital document 400 includes terms 402 indicating that signatures of the entities to the contract are needed, as well as identifies the entities 404 that are parties to the digital document. The digital document 400 includes machine-readable code indicating a modification 406 to the terms of the digital document. As shown, the modification 406 includes discounting the price five percent in the event that the listed delivery date is not met. The digital document 400 also includes a human readable description 408 of the modification. The digital document 400 includes terms 410 indicating defining the responsibilities of the entities. As show, the terms 410 include transferring ownership of digital twin and escrow if delivery is confirmed. Finally, the digital document 400 includes the cryptographic signatures 412 of the entities, which validates the digital document 400.

Figure 5:
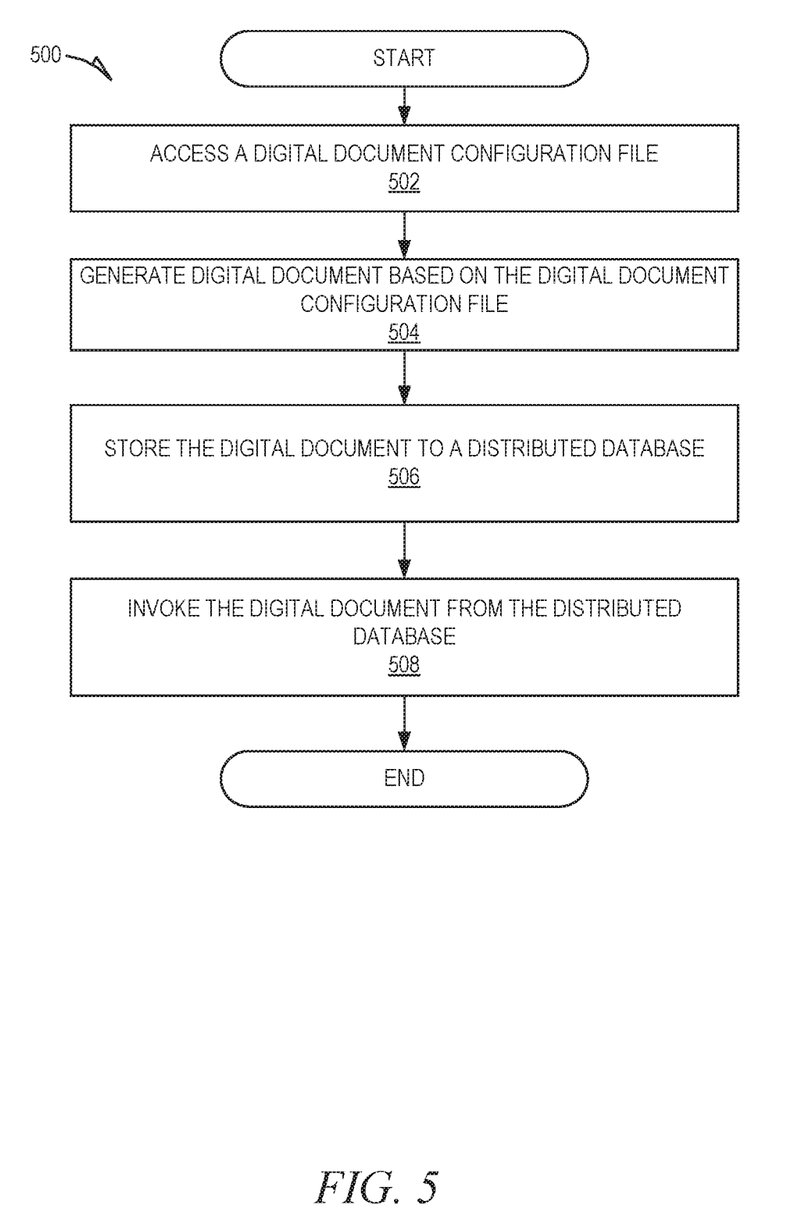
FIG. 5 is a flowchart showing an example method of implemented a digital document on a distributed database, according to certain example embodiments.

FIG. 5 is a flowchart showing an example method 500 of implemented a digital document on a distributed database, according to certain example embodiments. The method 500 may be embodied in computer readable instructions for execution by one or more processors such that the operations of the method 500 may be performed in part or in whole by the digital document system 106; accordingly, the method 500 is described below by way of example with reference thereto. However, it shall be appreciated that at least some of the operations of the method 500 may be deployed on various other hardware configurations and the method 500 is not intended to be limited to the digital document system 106.

At operation 502, the digital document engine 206 accesses a digital document configuration file. The digital document engine 206 accesses the digital document configuration file from the data storage 212. The digital document configuration file includes user provided data defining a contractual agreement between entities. The digital document configuration file is created by a user or, created using a template digital document provided by the digital document system 106.

At operation 504, the digital document engine 206 generates a digital document based on the digital document configuration files. That is, the digital document engine 206 generates a digital file that identifies the entities and terms of the digital document. The digital document engine 206 also generates the machine-readable code to perform any desired actions in relation to the terms of the digital document, such as determining whether a triggering event has occurred and modifying the terms of the digital document in the event that a triggering event has occurred. For example, the machine-readable code in a digital document may cause an invoice to be generated and sent to an appropriate entity of the contract for purchase of specified items. Further, the machine-readable code may cause a determination as to whether an agreed to delivery date was met, and adjust the price on the invoice in the event that the delivery date was not met. Accordingly, the digital document automatically enforces the terms of the contract.

For the digital document to become valid, each entity to the agreement provides the digital document system 106 with their cryptographic signature. Accordingly, the digital document engine 206 prompts the entities to the contract to provide their cryptographic signatures. The digital document engine 206 may provide the entities with a copy of the terms of the digital document, which the entities may review prior to providing the cryptographic signature. The digital document engine 206 may also enable the users to further modify the digital document if desired. If an entity modifies the digital document, the digital document engine 206 may transmit a revised draft of the digital document to each entity and prompt the entities to provide their cryptographic signatures. The digital document engine 206 deems the digital document as valid after receiving the cryptographic signatures of each entity based on a most recent version of the digital document. The digital document engine 206 adds the received cryptographic signatures to the digital document.

At operation 506, the distributed database module 208 stores the digital document to a distributed database. The distributed database 108 is a database that is consensually shared and synchronized across a network of computing devices spread across multiple sites, institutions or geographies. All data stored to the distributed database 108 by the distributed database module 208 is securely and accurately stored using cryptography and can be accessed using keys and cryptographic signatures. This provides each entity to the digital document with accessibility to the digital document using the appropriate private key.

At operation 508, the digital document invoking module 210 invokes the digital document from the distributed database. The digital document invoking module 210 enables an entity to request that a digital document be invoked. For example, the digital document invoking module 210 may require the entity to provide the private key needed to invoke the digital document, which the digital document invoking module 210 then uses to communicate with the distributed database 108 and invoke the digital document. Invoking the digital document causes the computer readable code included in the digital document to be executed. This may include performing specified action, checking in triggering events have occurred and/or modifying the terms of the digital document.

EXAMPLES

Example 1 is a method comprising: accessing a digital document configuration file stored in a database, the digital document configuration file identifying a first entity and a second entity to enter into an agreement, an initial set of terms for the agreement, and a modification to the initial set of terms corresponding to a triggering event; generating, using one or more hardware processor, a digital document based on the digital document configuration file, the digital document identifying the first entity, the second entity, and the initial set of terms, and including computer readable code to cause the initial set of terms to be modified according to the modification to the initial set of terms in response to occurrence of the triggering event; causing storage of the digital document to a distributed database that is synchronized across a network of devices, the digital document being invokable from the distributed database by the first entity and the second entity; in response to the first entity invoking the digital document from the distributed database, executing, by the one or more hardware processors, the computer readable code included in the digital document, the computer readable code causing the one or more hardware processors to perform operations comprising: determining whether the triggering event occurred, and in response to determining that the triggering event did occur, modifying the initial set of terms based on the modification to the initial set of terms.

In Example 2, the subject matter of Example 1 optionally includes receiving, from a client device, a request to generate the digital document, the request indicating a first contract category, accessing a set of digital document templates for the first contract category, each digital document template from the set of digital document templates including a set of template terms used for agreements in the first contract category; causing a listing of the set of digital document templates to be presented on the client device; receiving, from the client device, an input indicating selection of a first digital document template from the set of digital document templates; and transmitting the first digital document template to the client device, the digital document configuration file having been generated using the first digital document template.

In Example 3, the subject matter of Example 1 or Example 2 optionally includes receiving, from the client device, data indicating a modification to the set of template terms for the first digital document template; and modifying the set of template terms for the first digital document template based on the modification to the set of template terms for the first digital document template, yielding the digital document configuration file.

In Example 4, the subject matter of Examples 1 to 3 optionally includes wherein each digital document template has been certified by a trusted entity.

In Example 5, the subject matter of Examples 1 to 4 optionally includes receiving a first cryptographic signature of the first entity; and receiving a second cryptographic signature of the second entity, wherein the digital document is stored to the distributed database in response to receiving both the first cryptographic signature and the second cryptographic signature.

In Example 6, the subject matter of Examples 1 to 5 optionally includes wherein generating the digital document comprises adding the first cryptographic signature and the second cryptographic signature to the digital document.

In Example 7, the subject matter of Examples 1 to 6 optionally includes wherein the distributed database is a block chain.

Example 8 is computing system comprising: one or more computer processors; and one or more computer-readable mediums storing instructions that, when executed by the one or more computer processors, cause the computing system to perform operations comprising: accessing a digital document configuration file stored in a database, the digital document configuration file identifying a first entity and a second entity to enter into an agreement, an initial set of terms for the agreement, and a modification to the initial set of terms corresponding to a triggering event; generating a digital document based on the digital document configuration file, the digital document identifying the first entity, the second entity, and the initial set of terms, and including computer readable code to cause the initial set of terms to be modified according to the modification to the initial set of terms in response to occurrence of the triggering event; storing the digital document to a distributed database that is synchronized across a network of devices, the digital document being invokable from the distributed database by the first entity and the second entity; in response to the first entity invoking the digital document from the distributed database, executing the computer readable code included in the digital document, the computer readable code causing the one or more computer processors to perform operations comprising: determining whether the triggering event occurred, and in response to determining that the triggering event did occur, modifying the initial set of terms based on the modification to the initial set of terms.

In Example 9, the subject matter of Example 8 optionally includes receiving, from a client device, a request to generate the digital document, the request indicating a first contract category; accessing a set of digital document templates for the first contract category, each digital document template from the set of digital document templates including a set of template terms used for agreements in the first contract category; causing a listing of the set of digital document templates to be presented on the client device; receiving, from the client device, an input indicating selection of a first digital document template from the set of digital document templates; and transmitting the first digital document template to the client device, the digital document configuration file having been generated using the first digital document template.

In Example 10, the subject matter of Example 8 or Example 9 optionally includes receiving, from the client device, data indicating a modification to the set of template terms for the first digital document template; and modifying the set of template terms for the first digital document template based on the modification to the set of template terms for the first digital document template, yielding the digital document configuration file.

In Example 11, the subject matter of Examples 8 to 10 optionally includes wherein each digital document template has been certified by a trusted entity.

In Example 12, the subject matter of Examples 8 to 11 optionally includes receiving a first cryptographic signature of the first entity; and receiving a second cryptographic signature of the second entity, wherein the digital document is stored to the distributed database in response to receiving both the first cryptographic signature and the second cryptographic signature.

In Example 13, the subject matter of Examples 8 to 12 optionally includes wherein generating the digital document comprises adding the first cryptographic signature and the second cryptographic signature to the digital document.

In Example 14, the subject matter of Examples 8 to 13 optionally includes wherein the distributed database is a block chain.

Example 15 is a non-transitory computer-readable medium storing instructions that, when executed by one or more computer processors of a computing system, cause the computing system to perform operations comprising: accessing a digital document configuration file stored in a database, the digital document configuration file identifying a first entity and a second entity to enter into an agreement, an initial set of terms for the agreement, and a modification to the initial set of terms corresponding to a triggering event; generating a digital document based on the digital document configuration file, the digital document identifying the first entity, the second entity, and the initial set of terms, and including computer readable code to cause the initial set of terms to be modified according to the modification to the initial set of terms in response to occurrence of the triggering event; storing the digital document to a distributed database that is synchronized across a network of devices, the digital document being invokable from the distributed database by the first entity and the second entity; in response to the first entity invoking the digital document from the distributed database, executing the computer readable code included in the digital document, the computer readable code causing the one or more computer processors to perform operations comprising: determining whether the triggering event occurred, and in response to determining that the triggering event did occur, modifying the initial set of terms based on the modification to the initial set of terms.

In Example 16, the subject matter of Example 15 optionally includes receiving, from a client device, a request to generate the digital document, the request indicating a first contract category; accessing a set of digital document templates for the first contract category, each digital document template from the set of digital document templates including a set of template terms used for agreements in the first contract category; causing a listing of the set of digital document templates to be presented on the client device; receiving, from the client device, an input indicating selection of a first digital document template from the set of digital document templates, and transmitting the first digital document template to the client device, the digital document configuration file having been generated using the first digital document template.

In Example 17, the subject matter of Example 15 or Example 16 optionally includes receiving, from the client device, data indicating a modification to the set of template terms for the first digital document template; and modifying the set of template terms for the first digital document template based on the modification to the set of template terms for the first digital document template, yielding the digital document configuration file.

In Example 18, the subject matter of Examples 15 to 17 optionally includes wherein each digital document template has been certified by a trusted entity.

In Example 19, the subject matter of Examples 15 to 18 optionally includes receiving a first cryptographic signature of the first entity; receiving a second cryptographic signature of the second entity; and adding the first cryptographic signature and the second cryptographic signature to the digital document, wherein the digital document is stored to the distributed database after the first cryptographic signature and the second cryptographic signature have been added to the digital document.

In Example 20, the subject matter of Examples 15 to 19 optionally includes wherein the distributed database is a block chain.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Machine Architecture

Figure 6:
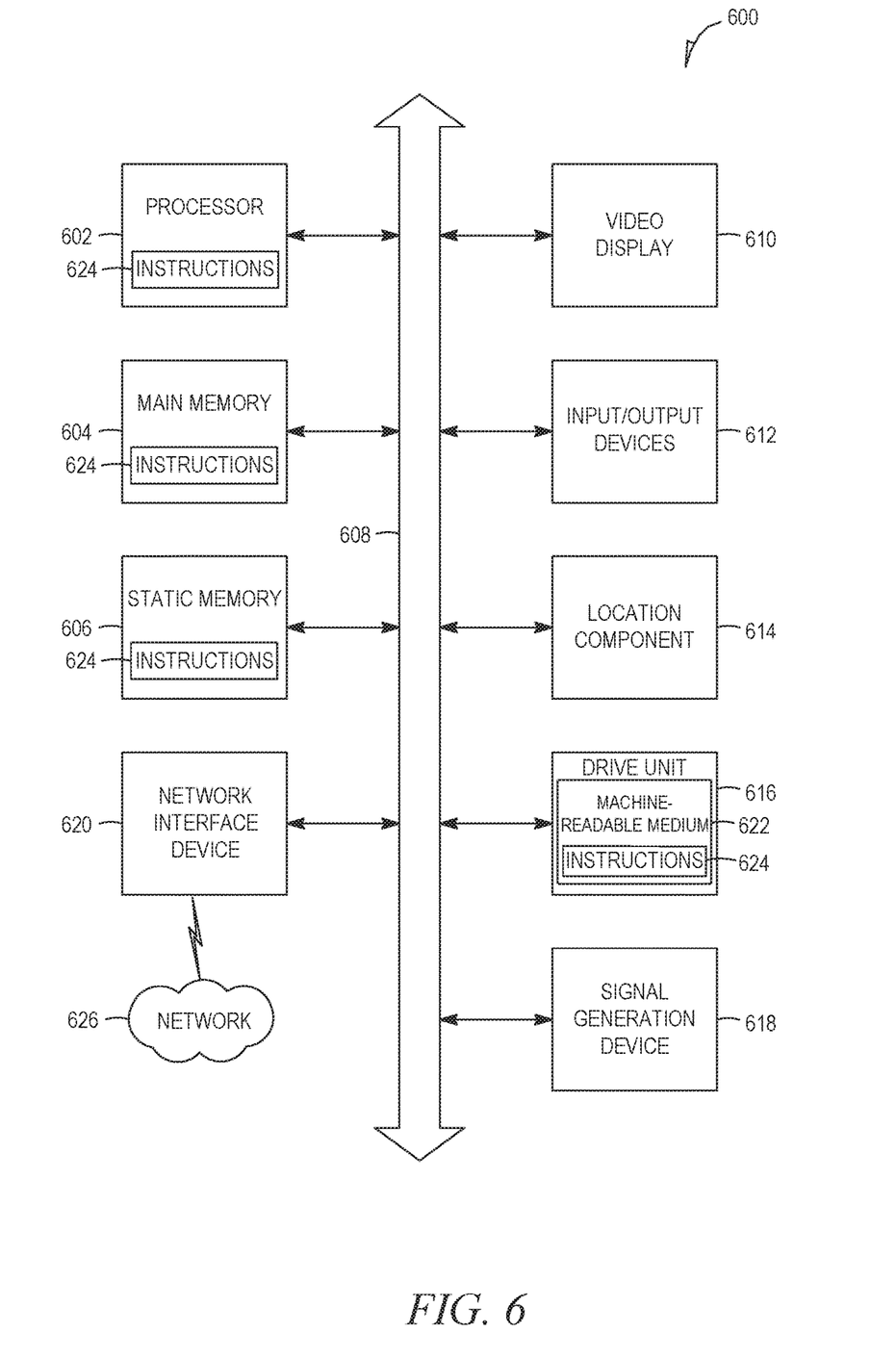
FIG. 6 is a diagrammatic representation of a machine in the example form of a computer system within which a set of instructions for causing the machine to perform any one or more of the methodologies discussed herein may be executed.

FIG. 6 is a diagrammatic representation of a machine in the example form of a computer system 600 within which a set of instructions for causing the machine to perform any one or more of the methodologies discussed herein may be executed. The computer system 600 may include instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine may, for example, be a personal computer (PC), a PDA, a cellular telephone, a smart phone (e.g., iPhone®), a tablet computer, a web appliance, a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data enabled book reader, a video game system console, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604, and a static memory 606, which communicate with each other via a bus 608. The computer system 600 may further include a video display 610 (e.g., a liquid crystal display (LCD) or a cathode ray tube (CRT)). The computer system 600 also includes one or more input/output (I/O) devices 612, a location component 614, a drive unit 616, a signal generation device 618 (e.g., a speaker), and a network interface device 620. The I/O devices 612 may, for example, include a keyboard, a mouse, a keypad, a multi-touch surface (e.g., a touchscreen or track pad), a microphone, a camera, and the like.

The location component 614 may be used for determining a location of the computer system 600. In some embodiments, the location component 614 may correspond to a GPS transceiver that may make use of the network interface device 620 to communicate GPS signals with a GPS satellite. The location component 614 may also be configured to determine a location of the computer system 600 by using an internet protocol (IP) address lookup or by triangulating a position based on nearby mobile communications towers. The location component 614 may be further configured to store a user-defined location in main memory 604 or static memory 606. In some embodiments, a mobile location enabled application may work in conjunction with the location component 614 and the network interface device 620 to transmit the location of the computer system 600 to an application server or third party server for the purpose of identifying the location of a user operating the computer system 600.

In some embodiments, the network interface device 620 may correspond to a transceiver and antenna. The transceiver may be configured to both transmit and receive cellular network signals, wireless data signals, or other types of signals via the antenna, depending on the nature of the computer system 600.

Machine-Readable Medium

The drive unit 616 includes a machine-readable medium 622 on which is stored one or more sets of data structures and instructions 624 (e.g., software) embodying or used by any one or more of the methodologies or functions described herein. The instructions 624 may also reside, completely or at least partially, within the main memory 604, the static memory 606, and/or the processor 602 during execution thereof by the computer system 600, with the main memory 604, the static memory 606, and the processor 602 also constituting machine-readable media.

Consistent with some embodiments, the instructions 624 may relate to the operations of an operating system (OS). Depending on the particular type of the computer system 600, the OS may, for example, be the iOS® operating system, the Android® operating system, a BlackBerry® operating system, the Microsoft® Windows® Phone operating system, Symbian® OS, or webOS®. Further, the instructions 624 may relate to operations performed by applications (commonly known as "apps"), consistent with some embodiments. One example of such an application is a mobile browser application that displays content, such as a web page or a user interface using a browser.

While the machine-readable medium 622 is shown in an example embodiment to be a single medium, the term "machine-readable medium" may include a single medium or multiple media (e.g., a centralized or distributed database, and/or associated caches and servers) that store the one or more data structures or instructions 624. The term "machine-readable medium" shall also be taken to include any tangible medium that is capable of storing, encoding, or carrying instructions (e.g., instructions 624) for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

Transmission Medium

The instructions 624 may further be transmitted or received over a network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, plain old telephone service (POTS) networks, and wireless data networks (e.g., WiFi and WiMax networks). The term "transmission medium" shall be taken to include any intangible medium that is capable of storing, encoding, or carrying the instructions 624 for execution by the machine, and includes digital or analog communications signals or other intangible media to facilitate communication of such software.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
receiving, from a client device, a request to generate a digital document, the request indicating a first contract category;
accessing a set of digital document templates for the first contract category, each digital document template from the set of digital document templates including a set of template terms used for agreements in the first contract category;
causing a listing of the set of digital document templates to be presented on the client device;
receiving, from the client device, an input indicating selection of a first digital document template from the set of digital document templates;
transmitting the first digital document template to the client device;
accessing a digital document configuration file stored in a database and generated using the first digital document template, the digital document configuration file identifying a first entity and a second entity to enter into an agreement, an initial set of terms for the agreement, and a modification to the initial set of terms corresponding to a triggering event;
generating, using one or more hardware processors, a digital document based on the digital document configuration file, the digital document identifying the first entity, the second entity, and the initial set of terms, and including computer readable code to cause the initial set of terms to be modified according to the modification to the initial set of terms in response to occurrence of the triggering event;
causing storage of the digital document to a distributed database that is synchronized across a network of devices, the digital document being invokable from the distributed database by the first entity and the second entity; and
in response to the first entity invoking the digital document from the distributed database, executing, by the one or more hardware processors, the computer readable code included in the digital document, the computer readable code causing the one or more hardware processors to perform operations comprising:
determining whether the triggering event occurred, and
in response to determining that the triggering event did occur, modifying the initial set of terms based on the modification to the initial set of terms.

2. The method of claim 1, further comprising:
receiving, from the client device, data indicating a modification to the set of template terms for the first digital document template; and
modifying the set of template terms for the first digital document template based on the modification to the set of template terms for the first digital document template, yielding the digital document configuration file.

3. The method of claim 1, wherein each digital document template has been certified by a trusted entity.

4. The method of claim 1, further comprising:
receiving a first cryptographic signature of the first entity; and
receiving a second cryptographic signature of the second entity, wherein the digital document is stored to the distributed database in response to receiving both the first cryptographic signature and the second cryptographic signature.

5. The method of claim 4, wherein generating the digital document comprises adding the first cryptographic signature and the second cryptographic signature to the digital document.

6. The method of claim 1, wherein the distributed database is a block chain.

7. A computing system comprising:
one or more computer processors; and
one or more computer-readable mediums storing instructions that, when executed by the one or more computer processors, cause the computing system to perform operations comprising:
receiving, from a client device, a request to generate a digital document, the request indicating a first contract category;
accessing a set of digital document templates for the first contract category, each digital document template from the set of digital document templates including a set of template terms used for agreements in the first contract category;
causing a listing of the set of digital document templates to be presented on the client device;
receiving, from the client device, an input indicating selection of a first digital document template from the set of digital document templates;
transmitting the first digital document template to the client device;
accessing a digital document configuration file stored in a database and generated using the first digital document template, the digital document configuration file identifying a first entity and a second entity to enter into an agreement, an initial set of terms for the agreement, and a modification to the initial set of terms corresponding to a triggering event;
generating a digital document based on the digital document configuration file, the digital document identifying the first entity, the second entity, and the initial set of terms, and including computer readable code to cause the initial set of terms to be modified according to the modification to the initial set of terms in response to occurrence of the triggering event;
storing the digital document to a distributed database that is synchronized across a network of devices, the digital document being invokable from the distributed database by the first entity and the second entity; and
in response to the first entity invoking the digital document from the distributed database, executing the computer readable code included in the digital document, the computer readable code causing the one or more computer processors to perform operations comprising:
determining whether the triggering event occurred, and
in response to determining that the triggering event did occur, modifying the initial set of terms based on the modification to the initial set of terms.

8. The computing system of claim 7, the operations further comprising:
receiving, from the client device, data indicating a modification to the set of template terms for the first digital document template; and
modifying the set of template terms for the first digital document template based on the modification to the set of template terms for the first digital document template, yielding the digital document configuration file.

9. The computing system of claim 7, wherein each digital document template has been certified by a trusted entity.

10. The computing system of claim 7, the operations further comprising:
   receiving a first cryptographic signature of the first entity; and
   receiving a second cryptographic signature of the second entity, wherein the digital document is stored to the distributed database in response to receiving both the first cryptographic signature and the second cryptographic signature.

11. The computing system of claim 10, wherein generating the digital document comprises adding the first cryptographic signature and the second cryptographic signature to the digital document.

12. The computing system of claim 7, wherein the distributed database is a block chain.

13. A non-transitory computer-readable medium storing instructions that, when executed by one or more computer processors of a computing system, cause the computing system to perform operations comprising:
   receiving, from a client device, a request to generate a digital document, the request indicating a first contract category;
   accessing a set of digital document templates for the first contract category, each digital document template from the set of digital document templates including a set of template terms used for agreements in the first contract category;
   causing a listing of the set of digital document templates to be presented on the client device;
   receiving, from the client device, an input indicating selection of a first digital document template from the set of digital document templates;
   transmitting the first digital document template to the client device;
   accessing a digital document configuration file stored in a database and generated using the first digital document template, the digital document configuration file identifying a first entity and a second entity to enter into an agreement, an initial set of terms for the agreement, and a modification to the initial set of terms corresponding to a triggering event;
   generating a digital document based on the digital document configuration file, the digital document identifying the first entity, the second entity, and the initial set of terms, and including computer readable code to cause the initial set of terms to be modified according to the modification to the initial set of terms in response to occurrence of the triggering event;
   storing the digital document to a distributed database that is synchronized across a network of devices, the digital document being invokable from the distributed database by the first entity and the second entity; and
   in response to the first entity invoking the digital document from the distributed database, executing the computer readable code included in the digital document, the computer readable code causing the one or more computer processors to perform operations comprising:
      determining whether the triggering event occurred, and
      in response to determining that the triggering event did occur, modifying the initial set of terms based on the modification to the initial set of terms.

14. The non-transitory computer-readable medium of claim 13, the operations further comprising:
   receiving, from the client device, data indicating a modification to the set of template terms for the first digital document template; and
   modifying the set of template terms for the first digital document template based on the modification to the set of template terms for the first digital document template, yielding the digital document configuration file.

15. The non-transitory computer-readable medium of claim 13, wherein each digital document template has been certified by a trusted entity.

16. The non-transitory computer-readable medium of claim 13, the operations further comprising:
   receiving a first cryptographic signature of the first entity;
   receiving a second cryptographic signature of the second entity; and
   adding the first cryptographic signature and the second cryptographic signature to the digital document, wherein the digital document is stored to the distributed database after the first cryptographic signature and the second cryptographic signature have been added to the digital document.

17. The non-transitory computer-readable medium of claim 13, wherein the distributed database is a block chain.

* * * * *